Patented Dec. 24, 1940

2,226,487

UNITED STATES PATENT OFFICE 2,226,487

BRAKE FLUID AND THE LIKE

Donald G. Zink, Linthicum Heights, Md., assignor to U. S. Industrial Alcohol Co., New York, N. Y., a corporation of West Virginia No Drawing. Application January 7, 1939, Serial No. 249,782

7 Claims. (Cl. 252—73)

This invention relates to fluid compositions suitable for use in hydraulically operated mechanisms; particularly, energy transmitting devices as, for example, hydraulic braking systems, hydraulic jacks, hydraulic shock absorbers, and hydraulic recoil mechanisms.

A satisfactory fluid for use in hydraulic systems, particularly in the hydraulic braking systems of automobiles, must remain unchanged in its capabilities and action under very diverse conditions. For example, it must retain its fluidity at the lowest temperatures so that the remotest part of the hydraulically operated system may be energized easily and quickly. Conversely, its viscosity at the highest operating temperature must be of sufficient magnitude to prevent leakage past working surfaces.

The satisfactory hydraulic fluid must be non-injurious to metal and rubber parts used in the system. Its action on rubber is of special importance, for the majority of liquids tend to dissolve or swell the rubber piston caps, diaphragms, gaskets and the like, present in hydraulic braking systems. The fluid must have little or no effect on the individual metals or combinations of metals comprising the hydraulic system. Often, fluids which are relatively inert toward individual metals will cause excessive corrosion when the metals are placed in electrical contact with each other.

In addition to the above-named characteristics, a satisfactory fluid must be relatively non-volatile, in order to avoid vapor locking of the mechanism at high operating temperatures. It should also be miscible with other materials and commercial fluids used for the same purpose, and should not have a deleterious effect on their stability. Likewise, any good hydraulic fluid must be stable under all operating conditions when used either alone or mixed with other commercial hydraulic fluids. Finally, it must possess sufficiently good lubricating properties to insure proper lubrication of all moving parts of the system at all operating temperatures.

Individually, these characteristics may be present in a great many fluids or fluid compositions, but liquids or liquid compositions having all of these characteristics in combination are extremely rare.

Brake fluids and the like of various compositions have been in use or have been proposed.

I have discovered a new type of brake fluid, or energy-transmitting fluid, the main constituent of which is 2 methyl pentane 2,4 diol, a chemical compound known to science but which has had no industrial use heretofore, as far as I am aware. This compound may be readily produced by the hydrogenation of diacetone alcohol.

2 methyl pentane 2,4 diol is a neutral, high boiling organic liquid having no corrosive action on the metals generally used in the construction of hydraulically operated mechanisms. It is not attacked by dilute alkalis or acids and, being saturated, does not oxidize under the highest operating temperature existing in hydraulically operated mechanisms.

2 methyl pentane 2,4 diol has practically no effect on the rubber piston cups and rubber gaskets, commonly used in brake systems. On the contrary, it tends to exert an inhibiting action on the rubber swell of other compounds, which may be mixed with it. This property makes it particularly well suited to use in automobile brake systems wherein rubber cups are used to seal the pistons operating the brake shoes.

A hydraulic brake or energy transmitting fluid, according to this invention, is composed essentially of 2 methyl pentane 2,4 diol in combination with one or more monohydric alcohol diluents of 4 to 6 carbon atoms adapted to produce with the 2 methyl pentane 2,4 diol a mixture having low freezing point and low-temperature viscosity characteristics substantially better than those of the 2 methyl pentane 2,4 diol alone. By incorporating a sufficient minor amount, readily ascertainable, of one or more of such diluents, a brake fluid, for example, is prepared that will operate satisfactorily and reliably at the lowest temperatures that may be reasonably expected in the use of such fluids, and be equally satisfactory at the highest temperatures that may be encountered or may develop in the system. Diluents especially suitable in combination with 2 methyl pentane 2,4 diol are butyl and amyl alcohols and fusel oil.

Certain of these diluents are also lubricants, meaning by this term that they afford a mixture having lubricating qualities superior to those of 2 methyl pentane 2,4 diol alone. The butyl, amyl, and hexyl alcohol, and fusel oil diluents have this function.

For a more detailed understanding of this invention, reference may be had to the following examples:

*Example 1.*—To 75 parts by weight of 2 methyl pentane 2,4 diol add 25 parts by weight of normal butyl alcohol. This mixture is ideal for use in the braking systems of automobiles, having no corrosive action on the metals now used in braking systems, and being serviceable at very high and very low temperatures. The diameters of rubber piston cups, when tested in this mixture at 78° C. increased from 2–3% of their original size in 24 hours, and showed no increase at the end of one week's time. The rubber cups after two weeks' testing in this mixture showed no loss of life, having no tendency toward brittleness or towards tackiness. Viscosity of the mixture at −40° C. is 6000 to 7000 seconds Saybolt (Universal).

*Example 2.*—To 85 parts by weight of 2 methyl pentane 2,4 diol add 15 parts of normal butyl alcohol. The viscosity of this type of mixture was found on test to be 15,800 Saybolt seconds (Universal) at −40° C. Rubber piston cups submerged in this fluid for 24 hours at 78° C. swelled 1.7% of their original diameters. At the end of one week the diameters of the cups were on the average 1.5% greater than the original diameters. This fluid, like the one described in the first example, is well suited for use in systems of motor cars, since it does not corrode any of the metals present.

Further illustration of the advantages of 2 methyl pentane 2,4 diol may be had by comparing its effect on rubber with that of one of the best liquids now in use in brake fluids, namely, castor oil. The diameters of rubber piston cups, submerged in the above-named liquids for one week at 78° C. increased in the case of the castor oil 2.7% and 0.7% in the case of 2 methyl pentane 2,4 diol.

Although I have described in detail certain forms of this invention, I wish it to be understood that this invention is not limited to these examples or the proportions stated therein. Furthermore, it will be apparent to those familiar with the art to which this invention pertains, that brake fluids may be made by mixing 2 methyl pentane 2,4 diol and one or more of the stated diluents, with or without minor additions of other diluents, modifiers or lubricants.

I claim:

1. A brake fluid comprising 2 methyl pentane 2,4 diol as its major constituent, and added diluent the major part of which is constituted by at least one monohydric alcohol of from 4–6 carbon atoms.

2. A brake fluid comprising 2 methyl pentane 2,4 diol as its major constituent, and added diluent the major part of which is constituted by at least one monohydric alcohol of from 4–5 carbon atoms.

3. A brake fluid comprising 2 methyl pentane 2,4 diol as its major constituent, in combination with butyl alcohol constituting at least a major part of the added diluent.

4. A brake fluid comprising 2 methyl pentane 2,4 diol as its major constituent, in combination with amyl alcohol constituting at least a major part of the added diluent.

5. A brake fluid comprising 2 methyl pentane 2,4 diol as its major constituent, in combination with fusel oil constituting at least a major part of the added diluent.

6. A brake fluid comprising 2 methyl pentane 2,4 diol as its major constituent, in combination with butyl alcohol constituting at least a major part of the added diluent, the ratio of the 2 methyl pentane 2,4 diol to the butyl alcohol being approximately 75:25.

7. A brake fluid comprising 2 methyl pentane 2,4 diol as its major constituent, in combination with butyl alcohol constituting at least a major part of the added diluent, the ratio of the 2 methyl pentane 2,4 diol to the butyl alcohol being approximately 85:15.

DONALD G. ZINK.